(12) United States Patent
Gleave et al.

(10) Patent No.: US 11,661,176 B2
(45) Date of Patent: May 30, 2023

(54) LANDING GEAR AND PIN LOCKED INDICATION

(71) Applicant: TRIUMPH AEROSPACE OPERATIONS UK, LTD, Flintshire (GB)

(72) Inventors: James Gleave, Gloucester (GB); Andrew Salcombe, Gloucester (GB)

(73) Assignee: Triumph Aerospace Operations UK, Ltd., Flintshire (GB)

( * ) Notice: Subject to any disclaimer, the term of this patent is extended or adjusted under 35 U.S.C. 154(b) by 71 days.

(21) Appl. No.: 17/429,840

(22) PCT Filed: Feb. 24, 2020

(86) PCT No.: PCT/US2020/019470
§ 371 (c)(1),
(2) Date: Aug. 10, 2021

(87) PCT Pub. No.: WO2020/180520
PCT Pub. Date: Sep. 10, 2020

(65) Prior Publication Data
US 2022/0126986 A1    Apr. 28, 2022

Related U.S. Application Data

(60) Provisional application No. 62/810,002, filed on Feb. 25, 2019.

(51) Int. Cl.
*B64C 25/28* (2006.01)
*B64D 45/00* (2006.01)

(52) U.S. Cl.
CPC .......... *B64C 25/28* (2013.01); *B64D 45/0005* (2013.01)

(58) Field of Classification Search
CPC ...... B64C 25/28; B64C 25/26; B64D 45/0005
See application file for complete search history.

(56) References Cited

FOREIGN PATENT DOCUMENTS

WO     2018/189299        10/2018
WO     WO-2018189299 A1 * 10/2018 ........... B64C 23/072

* cited by examiner

*Primary Examiner* — Justin M Benedik
(74) *Attorney, Agent, or Firm* — Stradley Ronon Stevens & Young, LLC

(57) ABSTRACT

Apparatus to monitor the position of an aircraft landing gear.

7 Claims, 4 Drawing Sheets

LANDING GEAR AND PIN LOCKED INDICATION

RELATED APPLICATIONS

This application is a national stage application under 35 U.S.C. 371 for International Application No. PCT/US20/19470, which claims the benefit of priority of U.S. Provisional Application No. 62/810,002, filed on Feb. 25, 2019, the entire contents of which application(s) are incorporated herein by reference.

FIELD OF THE INVENTION

The present invention relates generally to aircraft landing gears, and more particularly, but not exclusively, to an apparatus to monitor the position of the landing gear.

BACKGROUND OF THE INVENTION

Safety is paramount in the design and operation of aircraft, and one subsystem of particular importance is the landing gear system. For such safety reasons, aircraft computer systems need to monitor the position of the landing gears and pins associated therewith (hereinafter called a landing gear pin). Existing landing gear and door unlocks indicate the position of the landing gear, not by monitoring the position of the landing gear pins directly, but by using switches actuated by a latch to indicate when the uplock hook and latch are in the locked position (See FIG. 1). However, Applicant has recognized that situations can arise when the uplock hook and latch are in the locked position, but the landing gear is not locked in place. Accordingly, it would be an advance in the state-of-the-art to provide a landing gear detection apparatus for more directly detecting the location of the landing gear.

SUMMARY OF THE INVENTION

Accordingly, in one of its aspects, Applicant has conceived of an apparatus which may be used to de-activate (remove) an electrical signal to an aircraft's monitoring systems if a landing gear holding pin is not in the safely up and locked position. For example, in one exemplary configuration the present invention may provide a landing gear pin detection apparatus for detecting the presence of a landing gear pin retained within the apparatus. The apparatus may include a pin retention member mounted to a housing of the apparatus, with the pin retention member having an opening disposed therein for receiving the landing gear pin. In addition, one or more detectors, such as switches, may be mounted in the housing, and a latch may be rotatably mounted to the housing as well. The latch may include a proximal lever end and an opposing distal detector end, with the latch rotatable about a location intermediate the proximal and distal ends to move the detector end into and out of contact with the detectors. A pin detection lever may be rotatably mounted on the housing and have a distal latch end and a proximal pin end, with the proximal pin end disposed at a location to contact the landing gear pin when located in the opening. The proximal lever end of the latch may include a roller for rolling engagement with the distal latch end of the lever.

The apparatus may also include a lever spring operably connected to the pin detection lever to bias the pin detection lever against the landing gear pin, such as a linear and/or torsional spring. When the landing gear pin is not located in the pin retention member, the lever spring may be configured to rotate the distal latch end into contact with the proximal lever end of the latch. The distal latch end may push against the proximal lever end to rotate the latch to move the detector end of the latch out of contact with the one or more detectors.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1:
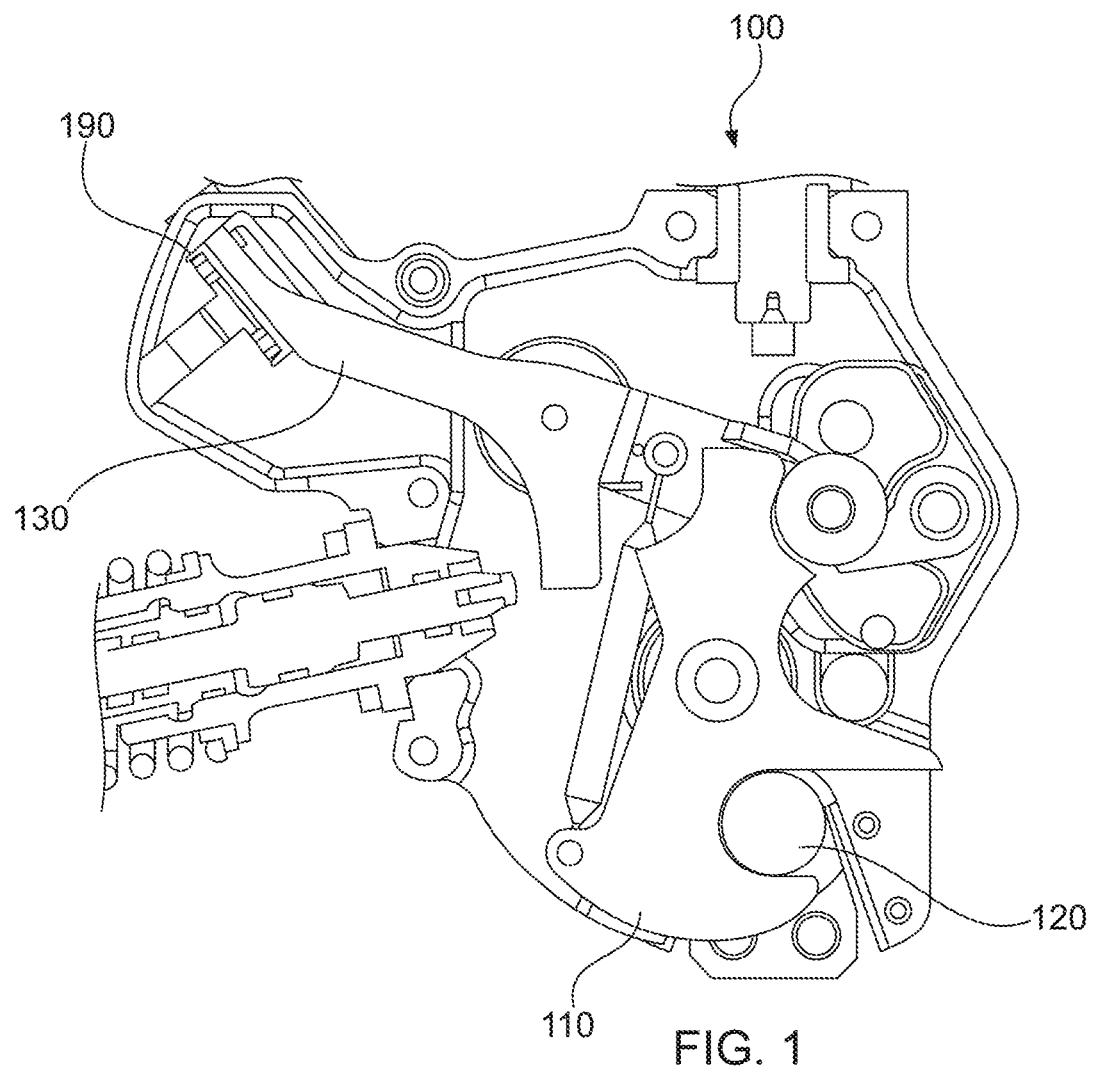
FIG. 1 schematically illustrates an existing landing gear pin detection apparatus showing the landing gear pin retained by a hook with detection switches engaged.
Figure 2:
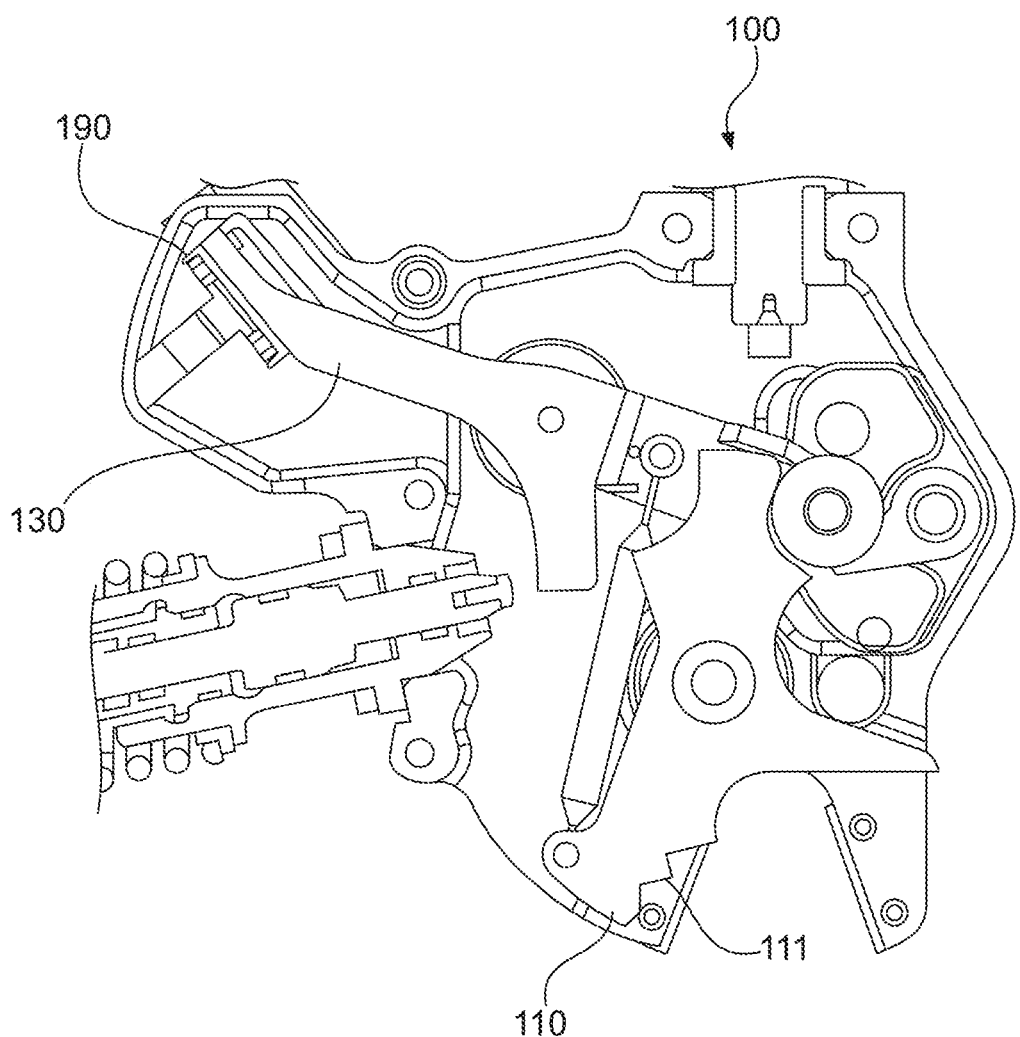
FIG. 2 schematically illustrates the landing gear pin detection apparatus of FIG. 1 but with a portion of the hook broken so the landing gear pin is not retained by the hook even though the detection switches remain positioned as if the landing gear pin were retained by the hook.

Referring now to the figures, wherein like elements are numbered alike throughout, FIGS. 1-2 illustrate a problem identified by the inventors with existing landing gear apparatus. Specifically, a vital purpose of the existing apparatus 100 is to indicate the presence of a landing gear pin 120 locked correctly in place within the apparatus 100. Locking of the landing gear pin 120 in place is accomplished through a latch 130 which moves in response to movement of a hook 110 locking into position around the landing gear pin 120. The latch 130 in turn is rotatable to make and break contact with switches 190, which switches signal that the uplock apparatus 100 has engaged and is retaining the landing gear pin 120. However, such an apparatus 100 may provide a false indication that the landing gear pin 120 is locked in position under certain conditions. For example, the switches 190 will continue to provide signals if the lower portion of the hook 110 includes a fracture or break 111 that allows the landing gear pin 120 to exit the uplock apparatus 100, FIG. 2. In such a situation, the aircraft computer is still being told that the landing gear pin 120 is being held by the uplock apparatus 100 when, in fact, the pin 120 is not.

Figure 3:
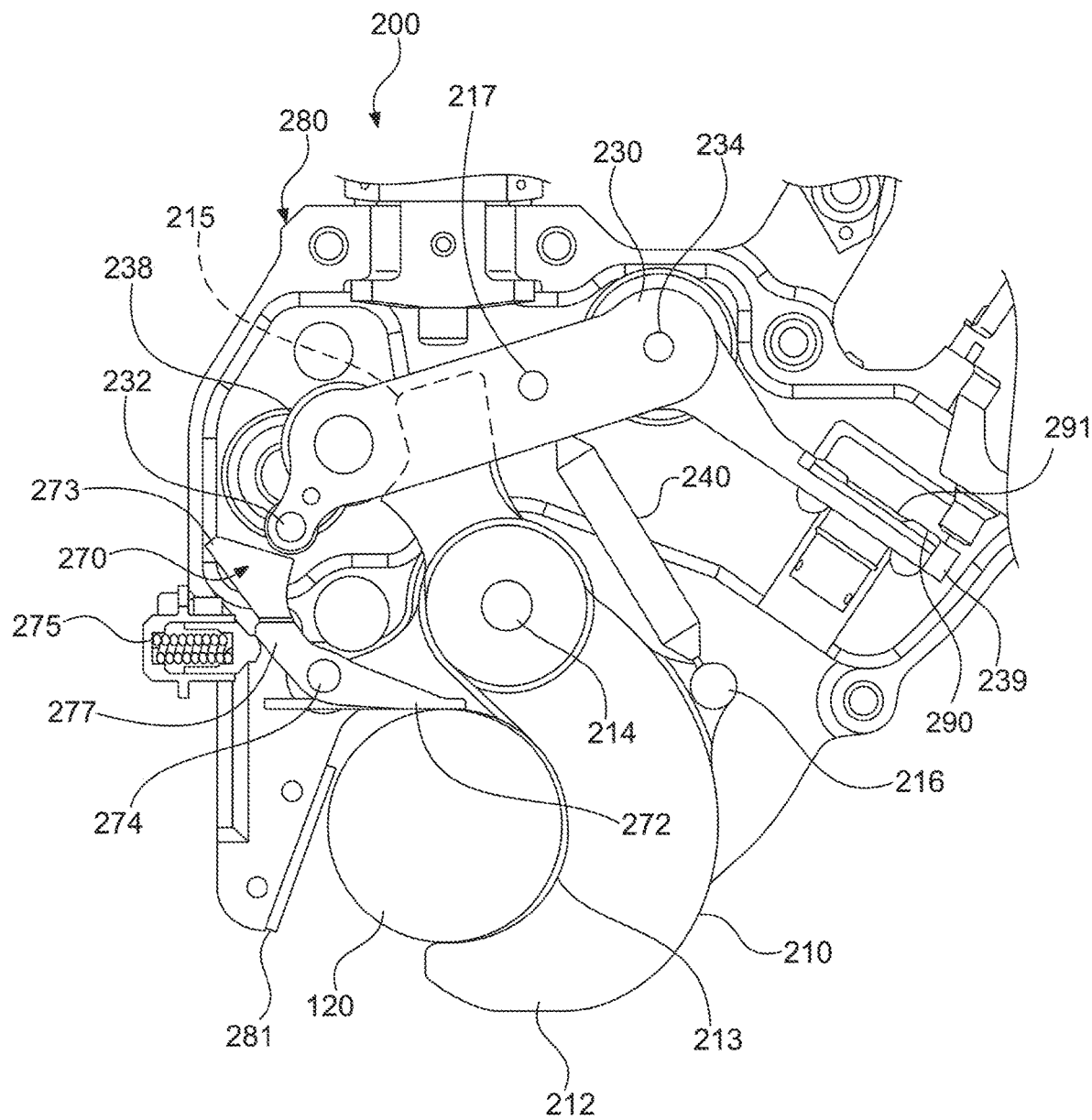
FIG. 3 schematically illustrates a landing gear pin detection apparatus in accordance with the present invention with detection switches engaged in response to the landing gear pin being retained by a hook.
Figure 4:
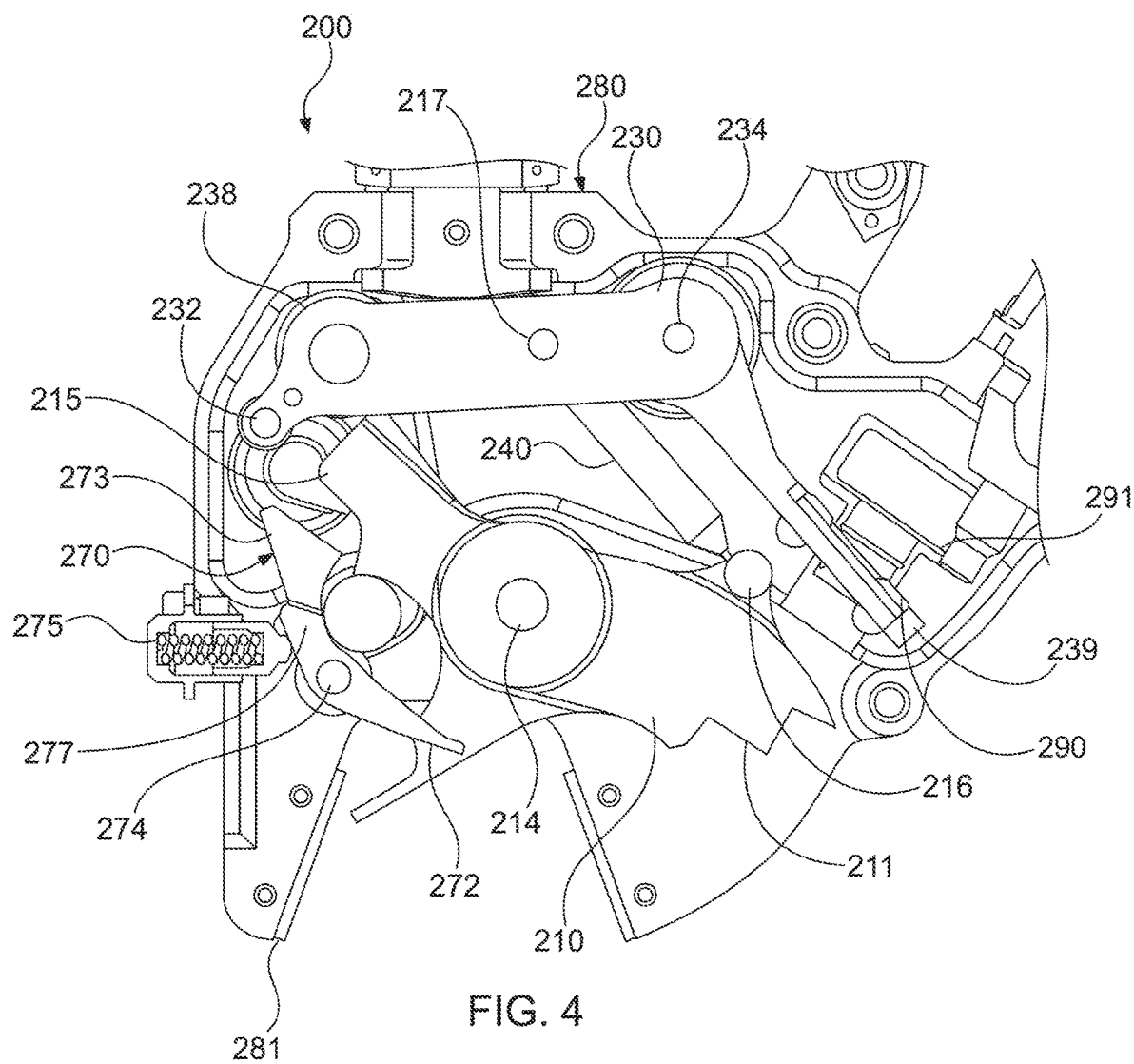
FIG. 4 schematically illustrates the landing gear pin detection apparatus of FIG. 3 but with a portion of the hook broken so the landing gear pin is not retained and the detection switches are not engaged indicating that the landing gear pin is not retained in the hook.

In recognition of this problem, Applicant has conceived of and designed a new landing gear pin detection apparatus 200, FIGS. 3-4, which more directly senses the presence or absence of the landing gear pin 120. Specifically, the apparatus 200 may include a spring operated pin detect lever 270 to monitor the position of the landing gear pin 120. During the locking of the uplock, the pin detect lever 270 may be rotated about a pivot point 274 by the landing gear pin 120, as the landing gear pin 120 engages a first end 272 of the lever 270 and the pin 120 approaches the locked position. Rotation of the pin detect lever 270 may compress a spring, such as a linear spring 275, against shoulder surface 277.

Alternatively or additionally, rotation of the pin detect lever 270 may compress a torsional spring disposed about the pivot point 274. Rotation of the pin detect lever 270 may function to move the pin detect lever 270 out of the way of a roller 232 on a latch 230, allowing the latch 230 to engage around the top of a pin retention member, such as a hook 210, FIG. 3. At a first end 212 of the hook 210 a mating surface 213 may be provided and shaped to retain the landing gear pin 120 therein.

When the landing gear pin 120 is in the correct position the pin detect lever 270 is pushed by the spring 275 onto the surface of the landing gear pin 120, FIG. 3. If the hook 210 develops a fracture or break 211, the landing gear pin 120 may exit the uplock, and the spring 275 will push against the shoulder 277 to rotate the first end 272 of the pin detect lever 270 into the space formerly occupied by the landing gear pin 120, FIG. 4. In turn, a second end 273 of the pin detect lever 270 opposing the first end 272 will then rotate into contact with the roller 232. The spring 275 will continue to rotate the pin detect lever 270 causing the second end 273 to continue to push against the roller 232 rotating the latch 230 about a pivot point 234 until the hook 210 is released, FIG. 4.

A tension spring 240 may be operably connected between the hook 210 at hook attachment point 216 and the latch 230 at latch attachment point 217 located between the pivot point 234 and roller 232. The tension spring 240 can then rotate the hook 210 about its pivot point 214 and further rotate the latch 230 about its pivot point 234 until a switch contact end 239 of the latch 230 is rotated out of contact with one or more detectors, such as switches 291, to de-activate the switches 291, thus, notifying an aircraft computer that the landing gear pin 120 is not in position.

Turning to the structure of the landing gear pin detection apparatus 200 in more detail, the apparatus may include hook 210 having a proximal end 212 an opposing distal end 215, the proximal end 212 having an arcuate mating surface 213 shaped to retain the landing gear pin 120 therein, FIG. 3. The hook 210 may be pivotally mounted to a housing 280 of the apparatus at a pivot point 214 disposed between the proximal and distal ends 212, 215 of the hook 210. The housing 280 may include a pin seating surface 281 disposed in opposition to the mating surface 213 of the hook 210, so that the landing gear pin 120 may be held in position between the surfaces 281, 213, with the hook 210 providing a biasing force on the landing gear pin 120 to urge the pin 120 against the surface 281. The pin detect lever 270 may include a first end 272 disposed in contact with pin 120, and the pin 120 may push against the first end 272 causing the pin detect lever 270 to rotate about a pivot point 274. An opposing force to rotation caused by the landing gear pin 120 may be applied to the pin detect lever 270 by action of spring 275 pressing against shoulder surface 277, with the pivot point 274 disposed between the shoulder surface 277 and the first end 272. Second end 273 of the pin detect lever 270 may be disposed adjacent the shoulder 277 and at an opposing location to the first end 272.

When the landing gear pin 120 is no longer retained in the apparatus 200, the continued biasing force provided by the spring 275 against the shoulder 277 may rotate the first end 272 of the pin detect lever 270 towards the seating surface 281 into the location occupied by the landing gear pin 120, FIG. 4. Such further rotation of the pin detect lever 270 may cause the second end 273 to rotate into contact with roller 232 of the latch 230.

The latch 230 may be provided in a generally V-shape with two opposing ends, first end 238 located proximate the rollers 232, and onto which end 238 the rollers 232 are mounted, and second switch contact end 239 disposed in opposition to the first end 238. The latch 230 may be rotatably mounted to the housing 280 at its vertex where the pivot point 234 may be located. The latch 230 and hook 210 may be mechanically linked to one another by tension spring 240 having opposing ends mounted to each of the latch 230 and hook 210, respectively. For example, the hook 210 may include attachment point 216 located between the proximal end 212 and pivot point 214, and the latch 230 may include an attachment point 217 disposed between the first end 238 and pivot point 234, with respective ends of the tension spring 240 connected between respective attachment points 216, 217. One or more detectors, such as switches 291 may be located at the switch contact end 239 and may be biased by the latch 230 to press against a switch mating surface 290 of the housing 280 to activate the switches 291, FIG. 3.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A landing gear pin detection apparatus for detecting the presence of a landing gear pin retained within the apparatus, the apparatus comprising:
   a pin retention member mounted to a housing of the apparatus, the pin retention member having an opening disposed therein for receiving the landing gear pm;
   one or more detectors mounted in the housing;
   a latch rotatably mounted to the housing, the latch having a proximal lever end and an opposing distal detector end, the latch rotatable about a location intermediate the proximal and distal ends to move the detector end into and out of contact with the one or more detectors;
   a pin detection lever devoid of detectors or detector ends and rotatably mounted on the housing and having a distal latch end and a proximal pin end, the distal latch end configured to contact and rotate the latch and the proximal pin end disposed at a location to contact the landing gear pin when the landing gear pin is located in the opening; and
   a lever spring configured to bias the pin detection lever against the landing gear pin when the pin is disposed in the pin retention member, and, when the pin is not located in the pin retention member, is configured to rotate the distal latch end of the pin detection lever into contact with the proximal lever end of the latch to rotate the latch to move the detector end of the latch out of contact with the one or more detectors.

2. The landing gear pin detection apparatus of claim 1, wherein the pin retention member comprises a hook.

3. The landing gear pin detection apparatus of any one of the preceding claims, wherein the spring comprises a linear spring.

4. The landing gear pin detection apparatus of any one of the preceding claims, wherein the spring comprises a torsion spring.

5. The landing gear pin detection apparatus of any one of the preceding claims, wherein the one or more detectors include a switch.

6. The landing gear pin detection apparatus of any one of the preceding claims, wherein the pin retention member is rotatably mounted in the housing and the housing includes a mating surface proximate the opening in the pin retention member to retain the pin in the opening in contact with the mating surface and the pin retention member.

7. The landing gear pin detection apparatus of any one of the preceding claims, wherein the proximal lever end of the latch includes a roller for rolling engagement with the distal latch end of the lever.

* * * * *